(No Model.) 4 Sheets—Sheet 2.

H. L. HOWE.
TRIPLE VALVE FOR AIR BRAKES.

No. 507,498. Patented Oct. 24, 1893.

Fig. 2.

Attest:
Walter Tamariss
George E. Cruce

Inventor:
Henry L. Howe
By Knight Bros.
Attys.

(No Model.)  4 Sheets—Sheet 3.
H. L. HOWE.
TRIPLE VALVE FOR AIR BRAKES.

No. 507,498. Patented Oct. 24, 1893.

Attest:
Walter Famanes
George E. Cruse.

Inventor.
Henry L. Howe.
By Knight Bros.
Attys.

(No Model.)
4 Sheets—Sheet 4.

H. L. HOWE.
TRIPLE VALVE FOR AIR BRAKES.

No. 507,498. Patented Oct. 24, 1893.

Attest:

Inventor:
Henry L. Howe.
By Knight Bros.
Attorneys.

UNITED STATES PATENT OFFICE.

HENRY L. HOWE, OF CANANDAIGUA, NEW YORK, ASSIGNOR OF ONE-HALF TO MAX C. BEARD, OF SAME PLACE.

TRIPLE VALVE FOR AIR-BRAKES.

SPECIFICATION forming part of Letters Patent No. 507,498, dated October 24, 1893.

Application filed February 6, 1892. Serial No. 420,496. (No model.)

*To all whom it may concern:*

Be it known that I, HENRY L. HOWE, a citizen of the United States, residing at Canandaigua, in the county of Ontario and State of New York, have invented certain new and useful Improvements in Triple Valves for Air-Brakes, of which the following is a specification.

My invention relates generally to a triple valve for fluid pressure brakes adapted by a variation of pressure in the train-pipe to cause the proper operation of the brakes and to charge the auxiliary reservoir; and it has for its object to materially simplify and improve the construction and operation of such valves to increase ther efficiency and to make their action more positive and more readily susceptible to the variations of pressure.

To this end the present improvements reside broadly in means whereby the auxiliary reservoir may be charged while the brakes are on; in the use of the two co-operating valves both capable of being moved by a single device, the one to control the putting on of the brakes by pressure from the auxiliary reservoir for ordinary service stops, and the other to control the putting on of the brakes by pressure direct from the train-pipe, supplemented it may be by that from the auxiliary reservoir for emergency stops. They also reside in a check valve controlling the train-pipe opening to the triple valve and a projection or arm adapted to prevent the check-valve from closing said opening at certain times. They furthermore reside in a yielding stop for checking the movement of the controlling valves, and for determining such movement in conjunction with the variation of pressure; and in various other constructions hereinafter fully set forth.

The improved triple valve is constructed and its operation is such that it controls the connection between the train-pipe and the auxiliary reservoir, the connection between said auxiliary reservoir and the brake-cylinder and the connection between the train-pipe and the brake-cylinder direct. These connections are in the preferred embodiment of the invention regulated by co-operating sliding valves which are moved by a suitable piston, and the piston is adapted through the medium of suitable connections between the train-pipe on one side and the train-pipe and auxiliary reservoir on its opposite side, to be moved by variations in the pressure in the train-pipe and by the rapidity with which these variations are effected.

The triple valve has the usual openings, for the train-pipe, the auxiliary reservoir and the brake-cylinder and all these openings communicate with a valve chamber in which are located the co-operating sliding valves which control communication between said valve chamber and the train-pipe and brake-cylinder openings. The valve chamber communicates with a piston cylinder in which is located a piston for controlling the two co-operating valves.

For convenience, I will describe the movement of this piston as "forward" and "backward," "forward" being toward the valves which it controls, and its "forward limit" being a seat which is provided for it at one end of the cylinder; and "backward" being in the opposite direction, and its "backward limit" being a projecting spring somewhat shorter than the stroke of the piston which checks backward movement of the piston according to the difference in pressure in front of and pressure behind the piston and adapted to retard the backward movement of the piston and to return the piston when relieved of pressure. Said piston is capable of assuming four effective positions: First, it may be at the forward limit of its stroke, at which time the co-operating valves occupy such position as to open the brake-cylinder to exhaust and permit the charging of the auxiliary reservoir from the train-pipe as in the ordinary running position. In the second place, the piston may be drawn backward by a slight reduction of air pressure behind it, so that it will come against the spring and slightly compress it, at which time the co-operating valves will have changed their relative positions to bring their ports into coincidence and thus open communication between the auxiliary reservoir and brake-cylinder and apply the brakes for a service stop; and at the same time have closed the exhaust from the brake-cylinder, without either of said co-operating valves disturbing the communication between the train-pipe and auxiliary reservoir. In the third place, by equalizing the pressure on opposite sides of the piston when the piston is in the position last mentioned, the spring will return it to a point between the first and second positions, when communication between the auxiliary reservoir, and the brake-cylinder will be entirely cut off, by the co-operating valves. The exhaust will not be opened, and the auxiliary reservoir may then be re-charged without releasing the brakes. In the fourth place the operation first described may be repeated by making a large reduction in the train-pipe pressure so that the piston will now move backward to the backward limit of its stroke, at which time the co-operating valves will move to such a position as to cut off direct communication between the train-pipe and the auxiliary reservoir through the valve chamber and open direct communication between the train-pipe and the brake-cylinder, and also if desired, to open communication through a direct opening or through the co-operating valves between the auxiliary reservoir and the brake cylinder. This last effect, either or both of said direct communications with the auxiliary reservoir, however, is not necessary though preferable, because it permits the brakes to be applied gently at first, as in service stops, and with heavy pressure immediately afterward. The result of this movement is to permit the rapid drawing off of the train-pipe pressure into the brake-cylinder and the subsequent direct expansion of the auxiliary reservoir pressure into the brake cylinder, so that the brakes are suddenly and forcibly applied as required in the case of an emergency stop. From the train pipe, communication is had with the front of the piston through the main passage which leads to the valve chamber while communication is also had with the rear of the piston through an independent passage. In the main passage from the train-pipe opening to the valve chamber and piston-cylinder is located a two-seated check-valve; while the piston carries a projection or arm which engages the two seated check valve and prevents the upward seating of said check valve when said piston is at either limit of its stroke, so that train-pipe pressure may pass to the auxiliary reservoir or to the brake-cylinder, as before explained. The two co-operative slide valves are so arranged that the outer one, to which the piston is connected, has a limited movement over the other and completes its independent throw in either direction during the ordinary operation of the triple valve in making service stops before engaging the inner valve, and is adapted in such ordinary operation to open communication between the valve-chamber and the recess of the inner valve by thus completing its throw in one direction; while said inner valve during ordinary use in service stop remains stationary, without disturbing the communication between the train-pipe passage and the auxiliary reservoir through the valve chamber and closing the communication between the brake-cylinder passage and the train pipe, so that the mere movement of the outer valve upon the inner one may serve to open communication between the valve chamber or the auxiliary reservoir with which said valve chamber is in constant communication, and the brake cylinder, without cutting off communication between the train-pipe and auxiliary reservoir through said chamber. These two valves are also so constructed and proportioned that a further movement of the outer one by the piston, after completing its throw during use in ordinary service stop, may be made for the purpose of throwing said inner valve and opening communication directly between the train-pipe passage and the brake cylinder, in additon to opening communication between the auxiliary reservoir and said brake-cylinder for use in emergency stop in which case the outer valve serves as a connecting means between the piston and said inner valve. Hence, it will be seen that the outer valve in its independent movement serves only to effect the service stop while the inner valve in its movement serves for effecting the emergency stop; and to open the exhaust from the brake-cylinder the return of both valves to their initial position must occur. The double check-valve in the train-pipe passage is adapted to seat upward or downward and permit the development of a pressure behind the piston through the duct from the train-pipe opening, which pressure may be greater than that in front of the piston and result in forcing the piston to its seat, or less than the pressure in front of the piston and result in drawing the piston away from its seat a greater or less distance according to the degree in reduction behind it. The spring forms a check or stop for the piston. This check or stop, however, is a yielding one and it is overcome to a greater or less extent according to the result to be produced.

My invention will be fully understood upon reference to the accompanying drawings, which show the triple valve in vertical longitudinal section and in which—

Figure 1:
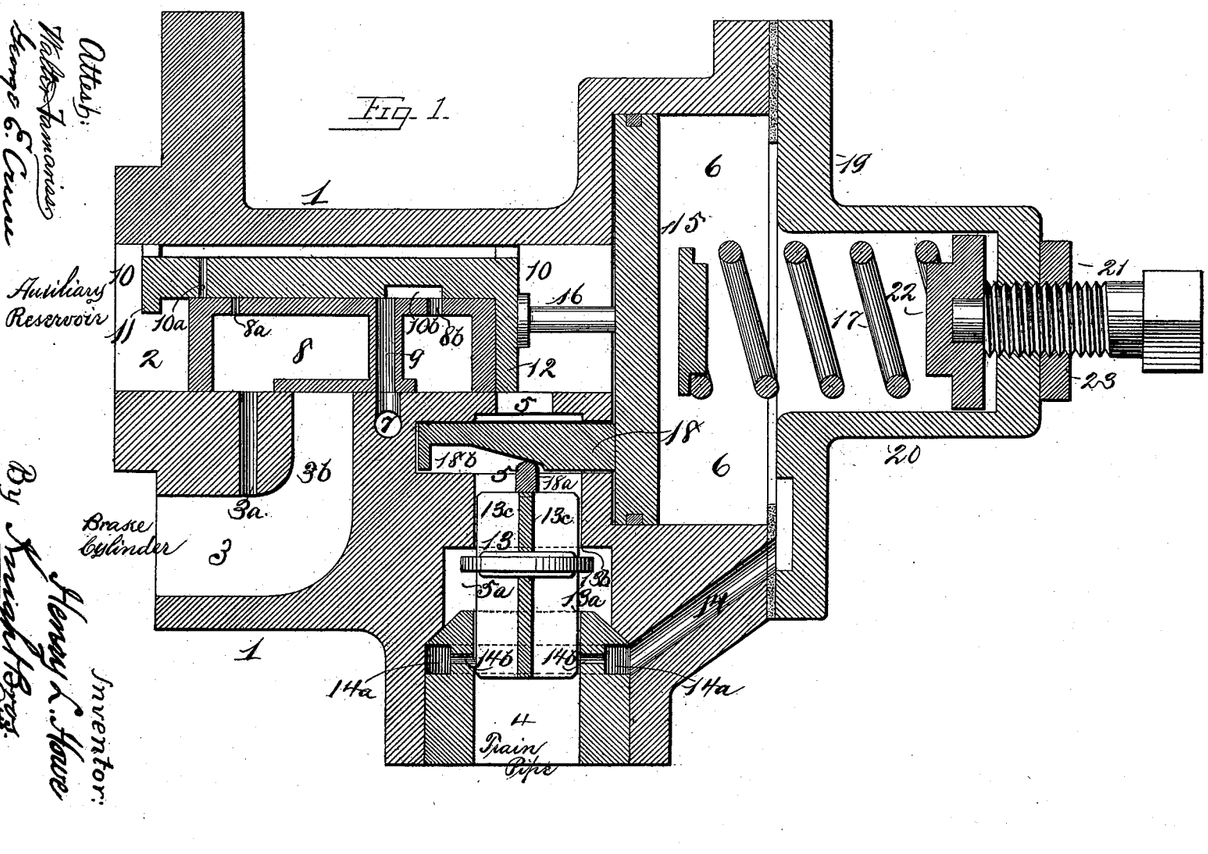
Figure 1, represents the parts in running position.
Figure 2:
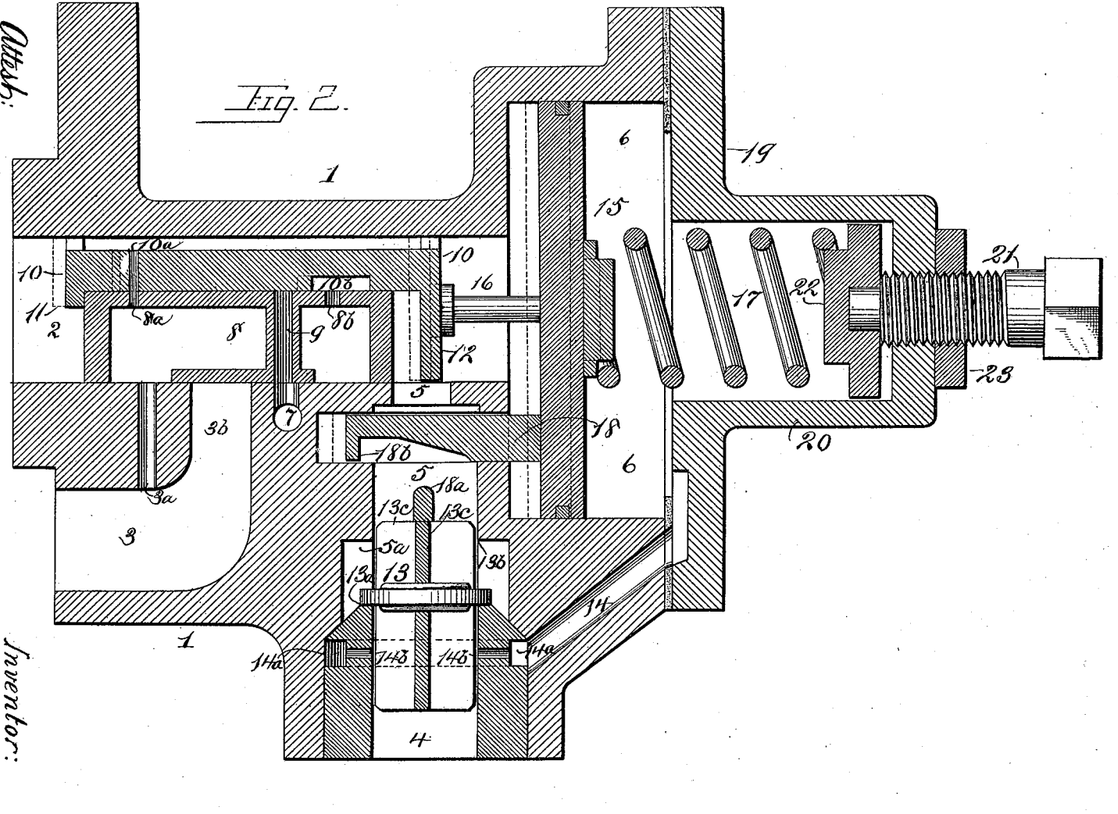
Fig. 2, shows the parts in service-stop.
Figure 3:
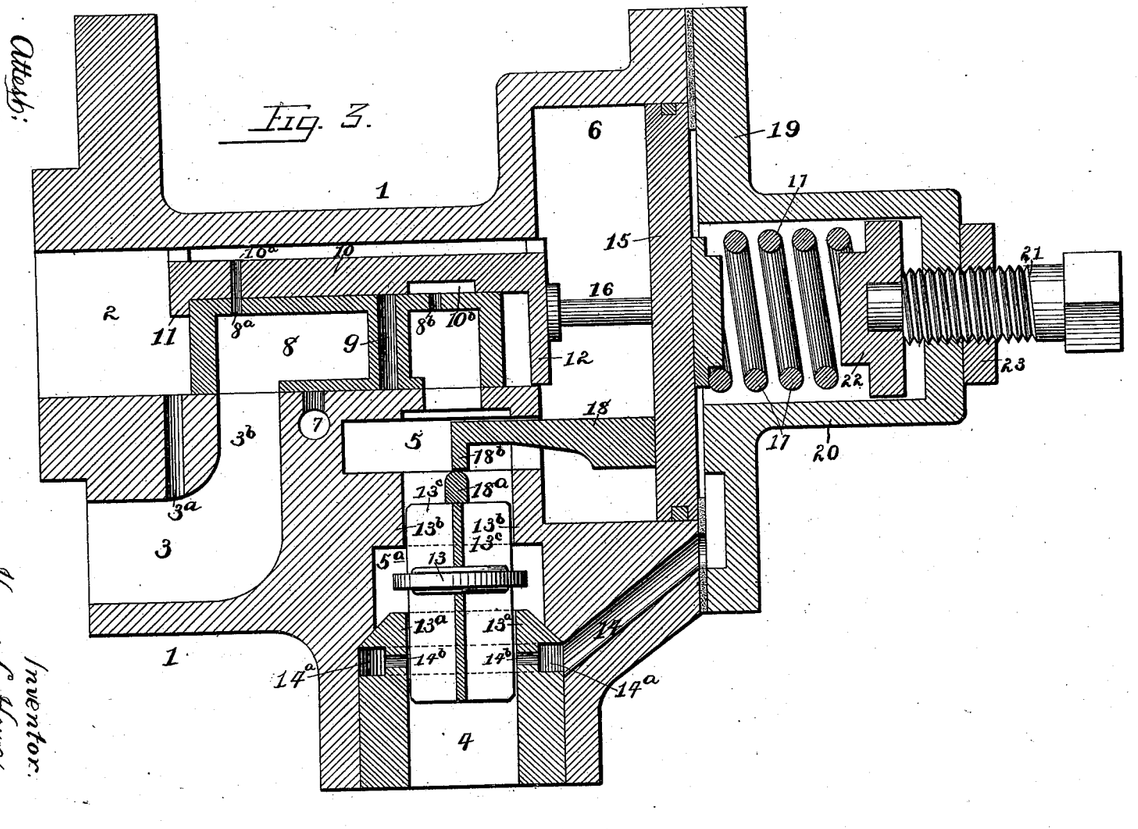
Fig. 3, represents the parts in emergency-stop position.
Figures 4, 5, 6, 7:
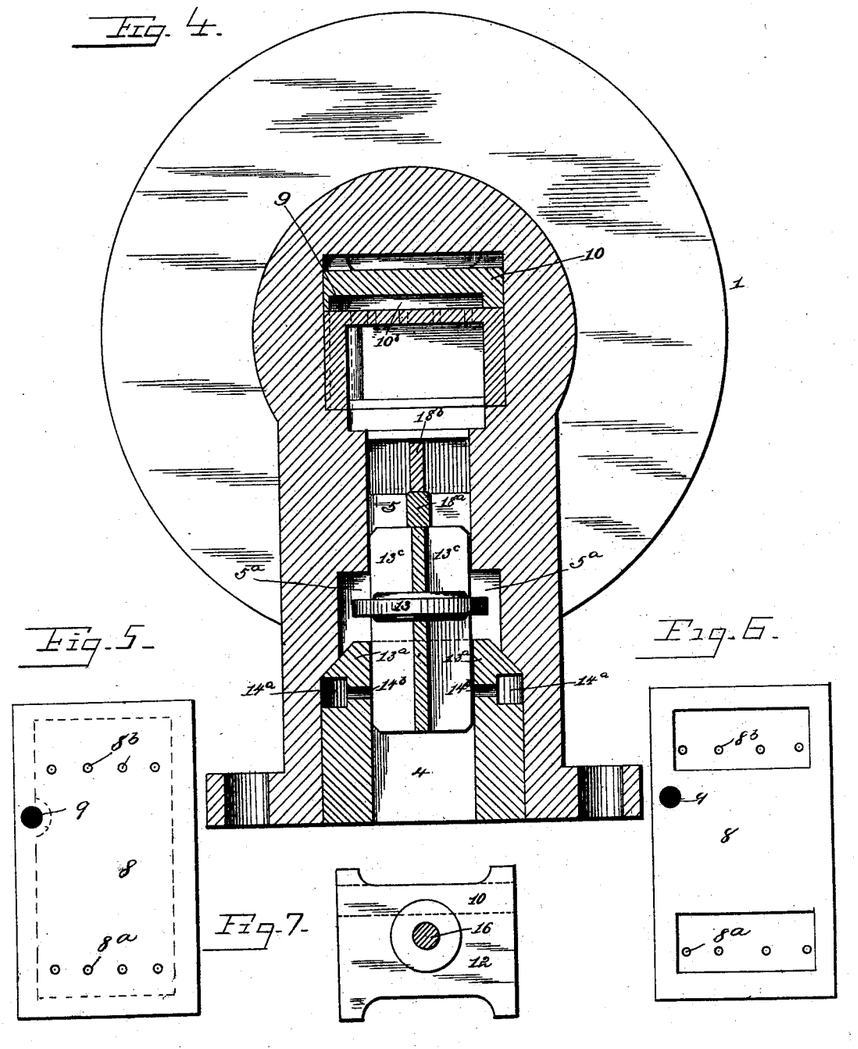
Fig. 4 is a transverse section on the line 4, 4, Fig. 3, showing the parts on an enlarged scale and looking toward the piston.
Figs. 5 and 6, are respectively top and bottom plans of the inner or recessed valve.
Figs. 7 and 8, are elevations of the respective ends of the upper slide valve.

The improved triple-valve consists of a shell 1, having a valve-chamber 2, and a piston-cylinder 6, open to the valve chamber; and said valve-chamber is open to an auxiliary reservoir as indicated in Fig. 1, has a passage $3^b$ or passages $3^b$, $3^a$ leading to the brake-cylinder opening 3, a passage 5 leading to the train-pipe opening 4, and a passage leading to the exhaust port 7.

Figure 8:
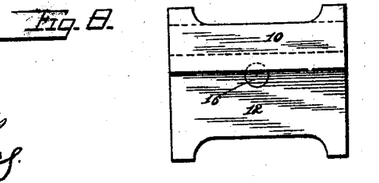

In the valve chamber 2 there is arranged a pair of valves adapted to control these passages and their communication with one another, their normal position permitting free communication between the train-pipe and the auxiliary reservoir through passage 5, the closing of the brake-cylinder from both the train-pipe and the auxiliary reservoir, and the opening of the brake-cylinder to the exhaust. Thus in said valve chamber is located a recessed slide valve 8 of such size and proportions and with its lower openings so arranged, that when the valves 8 and 10 are, as shown in Fig. 1, at their normal positions, the valve 8 will close duct $3^b$, and its cavity will communicate with duct $3^a$, and at the same time, the valve 10 will uncover the passage 5, so that communication is established between the train pipe and auxiliary reservoir. This valve 8 also has running through it, but not communicating with its recess, as shown in Figs. 1, 2, 3, 5 and 6, an exhaust duct 9, which, when said valve is at its said forward limit, coincides in position with the exhaust port 7. In the chamber 2 and partially surrounding the valve 8 is another valve 10, which is connected with and adapted to move the valve 8 by means of projections 11, 12. These projections are, however, so spaced that valve 10 has a limited movement relatively to the valve 8, and only moves the latter after first bringing one of the said projections against it, which occurs after said valve 10, has completed its individual or independent throw in either direction. The valve 10, is provided with a port, or series of ports, $10^a$, and a recess $10^b$, the former of which coincides with a port or series of ports $8^a$, in the valve 8 when said valve 10 is at the backward limit of its movement relatively to the valve 8, while the recess $10^b$, is adapted to open communication between a port or series of ports $8^b$, and the exhaust passage 9, when said valve 10 is at the forward limit of its movement relatively to the valve 8. The valve 10 therefore co-operates with the valve 8 to open and close communication between the valve chamber and the brake cylinder through the ports in said valves. This valve does not fill the entire cross-section of the valve chamber at any point but is formed to provide a space for the free passage of the pressure through the valve chamber 2, above the valves, as will appear upon reference to Figs. 4, 7 and 8.

In the passage 5, from the train pipe opening 4, to the valve-chamber 2, is located a double-seated check valve 13, which has a lower seat $13^a$, and an upper seat $13^b$. This double-seated check valve 13, works in an enlarged portion $5^a$, between its seats in the passage 5 and in order to guide said valve accurately it may be provided with vertical wings $13^c$, secured at angles to each other and to the valve 13. Communication is likewise established between the train-pipe opening 4 and the back end of the piston-cylinder 6, through the duct 14, and the annular channel $14^a$, and the perforations $14^b$. This communication is wholly independent of the movement of the check valve 13, and is constantly open. It is however, restricted in size.

In my triple valve it should be noted that the train-pipe opening is in a projection to one side of the piston and the air pressure is not communicated from the train-pipe to the valve-chamber through the piston-cylinder, so that the pressure is not cut off by the movement of said piston, and there being no flow of air through said cylinder there is no deposit of dust or dirt in the cylinder which would interfere with working of the piston.

In the piston-cylinder 6 is located the piston 15, having a stem 16, which is connected to valve 10. A spring 17, behind the piston 15, is adapted to hold said piston in a forward position, but the spring is of such length as to allow the piston to assume a position a short distance from its forward seat without coming in contact with said spring and also to move backward and slightly compressing it. When the piston is at its forward limit the rear projection 12, on the valve 10, is in contact with the valve 8, and said valve 8, is pushed forward to the position shown in Fig. 1. When said piston is withdrawn or moved backward and the spring slightly compressed the parts occupy the positions shown by full lines in Fig. 2, the exhaust duct 9, is closed and communication is established between the auxiliary reservoir and the brake-cylinder through the chamber 2, and ports $10^a$, $8^a$, and $3^a$, or $3^b$, which results in a gradual application of the brakes as for an ordinary service-stop. When the pressure is equalized on both sides of the piston and the spring is permitted to project the piston to the spring's limit, the parts 10, 16, 15, 17, 18 and $18^b$ occupy the positions shown by dotted lines in Fig. 2 and communication between the auxiliary reservoir and the brake-cylinder is cut off, but the exhaust is not opened, so that the brakes will be held on, and the auxiliary reservoir may be recharged. This recharging of the auxiliary reservoir may be accomplished by a slight increase in train pipe pressure just sufficient to overcome the weight of the check valve 13 without forcing it to its upper seat $13^b$, so that such pressure may pass by the thus floating check valve to the valve chamber 2, and thence to the auxiliary reservoir. When the piston is at its backward limit the parts occupy the positions shown in Fig. 3 at which time the co-operating valve 10 has completed its throw and also completed the throw of inner valve 8 by engagement therewith by projection 11, so that now direct communication between train-pipe and auxiliary reservoir is cut off and direct communication is established from chamber 2 to the brake cylinder opening, 3, through openings $3^a$, $10^a$, $8^a$, and $3^b$, and from the train-pipe directly to the brake-cylinder through port 5, the recess of valve 8 and opening $3^b$, and the pressure in the brake-cylinder is thus suddenly raised by the drawing off of pressure from the train-pipe through the large passages shown and is furthermore supplemented by pressure from the auxiliary reservoir so that the brakes are suddenly and forcibly applied as is desired in the case of an emergency stop. In order to prevent the seating of the double check-valve 13 against its upper seat $13^b$ when the piston is at the backward limit of its movement, and thus prevent the air rushing in from the train-pipe and communicating pressure to the brake-cylinder or to prevent seating of the valve when the piston is at its forward limit and the reservoir is being charged, the piston is provided with a peculiarly shaped arm 18, adapted to engage a projection $18^a$, on the wings of double check-valve 13 when said pistons reach the positions named. Said arm 18, however, is cut away at intermediate points on its lower edge so as to permit the double check valve 13 to reach its seat and close the passage to the auxiliary reservoir, and permit the development of pressure behind the piston, to bring the parts from the position of Fig. 2 to that of Fig. 1. This arm 18, engages the projection $18^a$ when the piston is at its forward limit by reason of the downward inclination of the lower edge while it engages said projection when the piston is at its backward limit, through the medium of a finger $18^b$ on its end. In order to accommodate the spring 17, the cylinder head 19 has a box 20 of proper size, and in order to regulate the tension of said spring 17 a set screw 21 having a pressure disk 22 is passed through the end of the box 20 and secured against turning by a lock-nut 23.

The operation of the device is as follows: In the normal position of the parts or in ordinary running position, the compressed air enters at the train-pipe opening 4 and passes through passage 5 to the valve chamber 2 to the front of the piston 15 and through said chamber to auxiliary reservoir. It also passes to the rear side of the piston 15, by the way of the smaller passage 14. During this passage of the air the check valve 13, is kept from its seat as indicated in Fig. 1, which shows the positions the parts occupy, while the train is running and the charging of the auxiliary reservoir is going on. Any desired pressure may be developed in the auxiliary reservoir. When it is desired to make a service stop, at which time the brakes are to be applied easily, a small reduction of about five pounds pressure is made in the train-pipe whereupon the double check valve 13 will move to its lower seat $13^a$ holding the pressure above it. At the same time the pressure behind the piston 15 will be correspondingly reduced, and being less than that in front of it, said piston will be caused to move backward into contact with and slightly compress its spring 17, but no farther, as the difference in pressure is not sufficient to further compress said spring. This backward movement of the piston effects the relative movement between the slide valves which is positive and exact, and moves the co-operating valve 10 to close the exhaust duct 9, and to bring the ports $8^a$, $10^a$, into coincidence and thus establishes communication through a restricted passage $8^a$, $10^a$, $3^a$, between the auxiliary reservoir and the brake-cylinder which results in the gradual application of the brakes. The parts now occupy the positions shown by full lines in Fig. 2. If it is desired now to release the brakes the pressure is suddenly raised in the train pipe when the double check valve 13 will move to its upper seat $13^b$ thereby temporarily cutting off communication between the train-pipe and the auxiliary reservoir, pressure will be developed behind the piston and the latter will be forced to its seat, thereby returning the parts 10, 16, 15, 17, 13 and 18 to the positions shown in Fig. 1, and causing the incline of the finger 18 to move the check valve 13 from its upper seat and again establishing direct communication between the train-pipe and the auxiliary reservoir, so that the train-pipe pressure, may pass on to the auxiliary reservoir. If, on the other hand, it is desired to retain the brakes for a length of time, as in case of a grade and to replenish the pressure in the auxiliary reservoir without releasing them, the pressure is slowly raised in the train-pipe until equalized on opposite sides of the piston, when the spring 17 will press the piston forward as far as the spring can reach closing ports $8^a$, $10^a$ as indicated by dotted lines in Fig. 2. The brake-cylinder is now cut off from the auxiliary reservoir but not opened to exhaust and while the brakes are held on, the auxiliary reservoir may be recharged by slowly raising the pressure in the train-pipe and avoiding the forcing of the double check valve 13 to its upper seat; the flow of the air not being sufficient to throw said valve to said upper seat. After recharging the auxiliary reservoir, the piston may again be moved backward by a slight reduction in train-pipe pressure and the brake-cylinder be again opened to the auxiliary reservoir pressure. This operation may be kept up indefinitely, so that the brakes need never be released on a grade for recharging the auxiliary reservoir. The brakes are released finally by a sudden raising of pressure in the train-pipe. If it is desired to make an emergency stop, the parts being in the position shown in Fig. 1, or in those shown in Fig. 2, while the train is running and the auxiliary reservoir is therefore charged, a large reduction in pressure is made in the train-pipe, such as fifteen or twenty pounds. This acts as before to seat the double check valve 13 on its lower seat $13^a$, and to force back the piston but this time the piston projecting spring will be compresed and the piston will move to its backward limit so that the slide valves in the chamber 2 will be drawn back to the position shown in Fig. 3. This position of the parts affords direct communication between the recess of valve 8 and the large brake-cylinder port 3<sup>b</sup> and also between said recess and the train-pipe passage 5. Two very important results are obtained by this last mentioned movement of the inner and co-operating valves: First, the train-pipe pressure is drawn off very quickly into the brake-cylinder and the brakes applied and held there without materially relieving the surplus pressure in the auxiliary reservoir and therefore not permitting the piston to return the inner and co-operating valves to service stop position; and second, a gentle pressure had been previously applied to the brakes by pressure from the auxiliary reservoir through the valve openings 10<sup>a</sup> and 8<sup>a</sup>, as in the service stop, and said pressure from the train-pipe is then further supplemented by the direct pressure from the auxiliary reservoir through the said openings. Furthermore it will be seen that in this position of the parts, the pressure in the train-pipe may be gently raised and transmitted directly to the brake-cylinder through valve 8, thus causing the triple valve to work "straight air" on an emergency stop. When the pressure becomes equalized on both sides of the piston and in the brake cylinder, the spring gradually returns the piston to the position shown by dotted lines in Fig. 2.

From the foregoing description, it will be seen that the triple valve has several advantages over other practiced forms, in that the communication between the train-pipe and auxiliary reservoir and the brake cylinder is not had through the piston cylinder. Hence, there being no flow of air through said piston cylinder no dirt can accumulate in the same to interfere with the movement of the piston 15; again, the air is never cut off from the train-pipe to the auxiliary reservoir by any movement of the piston 15, or of the valves 10 and 8 at any time; in service stop the air passes over the valve 10 to the auxiliary reservoir (as in Figs. 1 and 2) and in emergency stop through the recess of valve 8 and passage 3<sup>b</sup> and 3<sup>a</sup> to said reservoir (as in Fig. 3). Hence the check valve 13 serves as an equalizing device for the pressure from the train-pipe under the valve and that above said valve, and always permitting the pressure to be maintained or renewed while the brakes are on either in a service stop or in an emergency stop, and also when the brakes are off. When communication between the train-pipe and the auxiliary reservoir is cut off in a triple valve, the brakes are liable to be released and cause serious trouble, by the train pipe pressure becoming more than that in the auxiliary reservoir. In my triple valve this can never happen, because of the equalizing action of said check valve 13. It will also be seen that the two seated check valve 13 is always operated positively by air pressure on one side or the other. It is not dependent upon the action of any spring, and means are provided for absolutely preventing it from cutting off the air pressure flowing through from train-pipe when the piston is at either end of its throw or stroke. Should anything ever happen to the only spring employed in the device, the brakes can nevertheless be applied and even the emergency stop pressure be applied without difficulty.

There is no loss in pressure in the auxiliary reservoir occasioned by leakage into the train-pipe when the pressure is drawn down in said pipe for the purpose of applying the brakes, because the two-seated check-valve immediately seats itself on its lower seat 13<sup>a</sup> and closes the train-pipe passage. In triple valves which have an open charging slot or port, considerable leakage occurs until the piston has effected a sufficient movement to close the charging slot. The value of this improvement is obvious.

It will be observed, in conclusion, that as the force of the air pressure from the train pipe to the auxiliary or directly to the brake cylinder is on one side of the piston cylinder and not through said cylinder, as in many other forms of valves; and also that as the outer or rear side of the piston is open to the train pipe through a small passage; and that as the check valve is smaller in area than the piston I am enabled to constantly and gently supply pressure to the train pipe, and thence to the auxiliary reservoir or direct to the brake cylinder without any tendency of moving said piston, while so doing and thereby avoid the inadvertent movement of the valves 8 and 10 to release position.

Having thus described my invention, what I claim, and desire to secure by Letters Patent, is—

1. A triple valve having train pipe, auxiliary reservoir, exhaust and brake cylinder openings, a valve chamber with which said openings communicate, a valve in said chamber adapted to control communication between the exhaust and brake cylinder openings and normally holding the brake cylinder open to the exhaust and also controlling communication between the auxiliary reservoir and brake cylinder openings, a piston to operate said valve, communication between the respective sides of said piston and the train pipe, and a double seated check valve controlling communication between the train pipe and the valve chamber and one side of the piston.

2. In a triple valve having brake cylinder, exhaust and auxiliary reservoir openings, a recessed valve, the recess of which communicates with the exhaust and the brake cylinder openings, and another valve controlling the communication of the brake cylinder opening through the recess of the recessed valve with the exhaust and with the auxiliary reservoir opening, substantially as described.

3. A triple valve having a valve chamber, with auxiliary reservoir, brake cylinder and train pipe openings each leading into said chamber, and a valve in said chamber controlling communication between the auxiliary reservoir and the brake cylinder openings, and also communication between the train pipe and the brake cylinder openings and a double seated check valve in said train pipe opening, substantially as described.

4. A triple valve having a valve chamber, auxiliary reservoir, exhaust and brake cylinder openings, each communicating directly with said chamber, a slide valve in said chamber controlling communication between the brake cylinder and the exhaust openings and normally holding the brake cylinder open to the exhaust, and also controlling communication between the auxiliary reservoir and the brake cylinder openings, and a train pipe passage opening into said valve chamber independent of the auxiliary reservoir opening and thence through the valve chamber to the auxiliary reservoir, whereby the train pipe is in constant communication with the auxiliary reservoir during the controlling movements of said valve, substantially as described.

5. The combination with the triple valve, having the valve chamber and the auxiliary reservoir opening, the brake cylinder opening, and the train-pipe opening in combination with the valve chamber; of the sliding valve in said valve chamber adapted to establish communication between the valve-chamber and brake-cylinder by a partial movement in one direction and to establish communication between the train-pipe opening and said brake-cylinder by a continued movement in the same direction; a piston with which said valve is connected, communication between the respective sides of the piston and the train-pipe opening, and a two-seated check-valve between the train-pipe and one side of the piston.

6. A triple valve of the character described, having a piston operating a valve for opening and closing communication between the auxiliary reservoir and the brake-cylinder, a check-valve in the train-pipe passage; and a projection on the piston adapted to engage the check-valve when communication with the brake-cylinder is closed so that the auxiliary reservoir may be charged when communication with the brake-cylinder is closed; substantially in the manner explained.

7. A triple valve for fluid pressure brakes having a valve chamber; a passage from the auxiliary reservoir to said valve chamber; a passage from the brake-cylinder to said valve-chamber; a valve controlling the brake-cylinder passage, a piston controlling said valve; a passage communicating between the train-pipe and the valve-chamber and one side of the piston, a two-seated check-valve in said train-pipe passage, an independent passage between the train-pipe and the other side of the piston and means carried by the piston for holding the check-valve from its seat against pressure in the train-pipe when the brake-cylinder is open to the train-pipe through the valve, substantially as and for the purpose set forth.

8. A triple valve for fluid pressure brakes having passages for communication with the brake-cylinder and train pipe; a valve for connecting the brake-cylinder and train-pipe passage; a piston for moving said valve; communication with one side of the piston from the train-pipe passage; a two-seated check valve in said train-pipe passage; an independent passage for communication between the train-pipe and the other side of the piston; and an arm on the piston for engaging the two-seated check valve and preventing it from seating by air pressure in the train-pipe, substantially as explained.

9. A triple valve having train-pipe, auxiliary reservoir and brake cylinder openings, a valve chamber interposed between and forming a communicating passage from the train pipe opening to the auxiliary reservoir opening, a valve in said chamber controlling communication with the brake cylinder opening, and normally holding said cylinder open to atmosphere, a solid piston controlling said valve interposed between said train pipe opening that leads into the valve chamber on one side of said piston, and another opening from the train pipe leading only to the opposite side of said piston, substantially as described.

10. A triple valve having openings communicating independently with the auxiliary reservoir, brake cylinder and train pipe passages, a single valve chamber into which said passages lead, and forming a connecting passage from the train pipe to the auxiliary reservoir, and a single valve in said chamber controlling communication between the brake cylinder and the train pipe passages, and also communication between the train pipe and said valve chamber, and a double seated check valve in said train pipe passage, substantially as set forth.

11. The combination with a triple valve of an air brake apparatus, of a check valve in the train pipe passage seating upwardly, and a movable stop positively preventing the seating of said check valve, substantially as described.

12. The combination with a triple valve of an air brake apparatus, of a check valve in the train pipe passage seating upwardly, and a movable stop carried by a part of the triple valve to positively obstruct the seating of said check valve, substantially as described.

13. A triple valve having a valve chamber with brake cylinder, exhaust, auxiliary reservoir and train pipe openings, each communicating with said chamber, and said valve chamber forming a communicating passage from the train pipe to the auxiliary reservoir, a valve in said chamber controlling communication between the train pipe and brake cylinder openings, also between the brake cylinder and exhaust openings and normally holding said openings in communication and also between the valve chamber and train pipe opening, substantially as described.

14. A triple valve having a valve chamber with brake cylinder, exhaust, auxiliary reservoir and train pipe openings each communicating with said chamber, and said valve chamber forming a communicating passage from the train pipe to the auxiliary reservoir, a valve in said chamber controlling communication between the valve chamber and brake cylinder opening, also between brake cylinder and exhaust openings and normally holding the said openings in communication and also between the train pipe and brake cylinder openings, substantially as described.

15. A triple valve having a valve chamber with brake cylinder, exhaust, auxiliary reservoir and train pipe openings, each communicating with said chamber, and said valve chamber forming a communicating passage from the train pipe to the auxiliary reservoir, a valve in said chamber controlling communication between the valve chamber and brake cylinder opening, between the brake cylinder and exhaust openings, and normally holding said openings in communication between the train pipe and brake cylinder openings, and between the valve chamber and train pipe opening, substantially as described.

16. A triple valve for fluid pressure brakes, having a brake cylinder and train pipe openings, a valve controlling said openings and placing them in communication, a check valve in the train pipe opening leading to said first named valve, and positive means for preventing the seating of the check valve during such communication, substantially as described.

17. In a triple valve for fluid pressure brakes, a single valve chamber, the herein described two valves in said chamber, one normally stationary and adapted to move to open communication between the train pipe and brake cylinder openings, and the other valve movable independent of the first named valve to close communication between the brake cylinder and exhaust port and to open communication between the auxiliary reservoir and the brake cylinder and hold the same open during the opening movement of the first named valve.

18. In a triple valve for fluid pressure brakes, the combination of a single valve chamber, the herein described two valves in said chamber, one normally stationary and adapted to move to open communication between the train-pipe and brake-cylinder openings, and the other valve movable independent of the first named valve to close communication between the brake cylinder and exhaust port and to open communication between the auxiliary reservoir and the brake cylinder, a single piston positively connected to and moving one valve and connections with the other valve for moving it.

19. In a triple valve for fluid pressure brakes, the combination with a valve chamber, a valve in said chamber controlling communication between the train pipe and brake cylinder openings and the auxiliary reservoir and brake cylinder openings, and another valve in said chamber movable independent of the first named valve to open and close communition between the auxiliary reservoir and brake cylinder openings, and hold said communication open during the opening movement of the first named valve.

20. A triple valve having train pipe, auxiliary reservoir, brake cylinder and exhaust openings, a valve controlling communication between the train pipe, the auxiliary reservoir and the brake cylinder, between the brake cylinder and the exhaust, and normally holding said openings in communication, and between the train pipe and auxiliary reservoir, and a piston connected with said valve and interposed between said train pipe opening and a passage from the train pipe leading only to one side of said piston, substantially as described.

21. A triple valve having train pipe, auxiliary reservoir, brake cylinder and exhaust openings, a valve controlling communication between the auxiliary reservoir and brake cylinder, between the train pipe and brake cylinder, between the exhaust and brake cylinder, and normally holding the said cylinder in communication with the exhaust, and between the train pipe and auxiliary reservoir, and a piston connected with said valve and interposed between said train pipe opening and a passage from the train pipe leading only to one side of said piston, and a double seated check valve in the train pipe, substantially as described.

HENRY L. HOWE.

Witnesses:
JAMES A. ROBSON,
CHARLES A. RICHARDSON.